July 3, 1962

W. ALLEN 3,041,740

AIR SQUEEGEES FOR MOTION PICTURE FILM OR OTHER WEBS

Filed June 30, 1959

INVENTOR.
WILLIAM ALLEN

BY
J.B. Felshin
ATTORNEY.

United States Patent Office 3,041,740
Patented July 3, 1962

3,041,740
AIR SQUEEGEES FOR MOTION PICTURE FILM OR OTHER WEBS
William Allen, Bellerose, N.Y., assignor to S.O.S. Cinema Supply Corp., New York, N.Y., a corporation of New York
Filed June 30, 1959, Ser. No. 823,956
10 Claims. (Cl. 34—160)

This invention relates to film squeegees for motion picture film or other webs or flexible strips and pertains particularly to a squeegee using a continuous stream of forced air for drying a film or web after processing.

It is an object of this invention to provide a highly improved air type film squeegee which can be used while the film is in motion, and which can easily be mounted in any part of a film cleaning or processing machine.

It is another object of this invention to provide an air type film squeegee of the character described which will direct a forced stream of air against a film in a direction opposite to the direction of the travel of the film, and which shall have means to direct the flow of air away from the surface of the film after having blown across the film surface to dry the film, and whereby to carry moisture away from the film so as not to leave dust particles on the film, and to prevent excessive carryover and eliminate drying marks on the film.

It is a further object of this invention to provide a squeegee of the type described which can be adjusted to direct an air flow in either of two directions, so that identical units may be mounted on both sides of a moving film, and adjusted to direct the air against the direction of film travel.

It is a further object of this invention to provide an air type film squeegee which is simple in design, inexpensive to manufacture, which shall have fine adjustments, and which shall yet be practical and efficient to a high degree in use.

Other objects of this invention will in part be obvious and in part be hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention.

Figure 1:
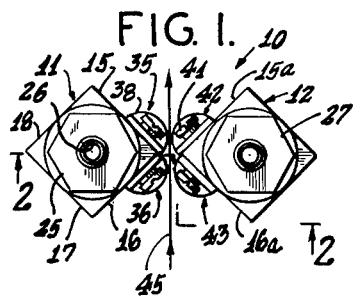
FIG. 1 is a top plan view of a pair of film squeegees embodying the invention.
Figure 2:
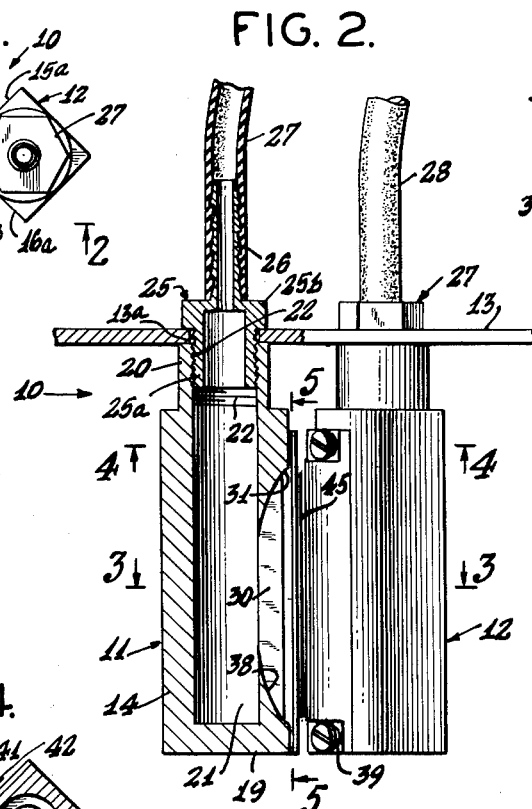
FIG. 2 is a partially cross-sectioned side view taken on the line 2—2 of FIG. 1.
Figure 4A:
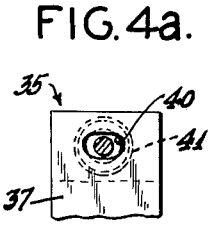
FIG. 4a is a fragmentary view of a portion of a guide bar used in the invention, taken on the line 4a—4a of FIG. 4.
Figure 5:
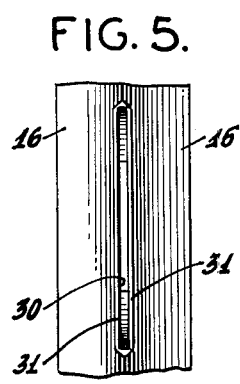
FIG. 5 is an elevational view of a portion of the device taken on the line 5—5 of FIG. 2.
Figure 4:
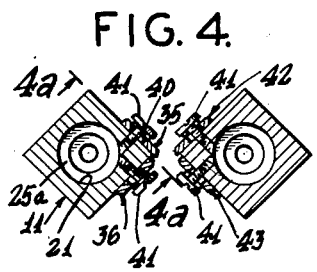
FIG. 4 is a cross-sectional view taken on the line 4—4 of FIG. 2.

Referring now in detail to the drawings, the invention 10 comprises a pair of similar, symmetrically disposed film squeegees 11 and 12. Each of the two film squeegees 11 and 12 are mounted on a plate 13 which may be part of a film processing, cleaning, soundstripping machine, or other machine. The two squeegees are identical and each is formed as the unit 11 from a main body member 14 which is in the shape of an elongated hollow block of square cross-section. Each body block 14 is formed with four side surface walls 15, 16, 17 and 18, and a bottom wall 19. The block is further formed with an upstanding cylindrical neck 20. The body is further formed with an internal cylindrical chamber or bore 21 extending from the neck 20 and terminating short of the bottom wall 19. The upper portion of bore 21 within the neck 20 is threaded as at 22. An adaptor cap 25 has an externally threaded sleeve 25a screwed into the threaded opening 22 of neck 20 of the squeegee body so as to retain the same on the plate 13, and has a nozzle end 26 fitted into the end of a rubber air hose 27 from which a supply of forced dry air is received. Similar, a hose 28 feeds squeegee 12 through a threaded adapter cap 27.

The body 14 is formed with a milled, longitudinal, diagonal or radial slot 30 between the two adjacent walls 15 and 16, and the corner of the block is cut off across the surface of slot 30, forming the flat edges 31 on the sides of the slot. The slot 30 communicates with the cylindrical chamber 21 in the body of the squeegee. Plate 13 has openings 13a receiving sleeve 25a. Adapter 25 has a nut shaped collar 25b contacting the plate 13.

Fixed to the side walls 15 and 16 of the squeegee body are a pair of identical guide bars 35 and 36. Each guide bar is formed of an elongated strip of highly polished metallic material. Bar 35 has a flat surface 37 contacting the side wall to which it is affixed and an opposite rounded or semi-cylindrical surface 38. The ends of each rounded surface 38 are flattened as at 39 and each is formed with a transverse oblong opening 40 for an attachment screw 41 which is screwed into the block 14. The openings 40 are elongated sideways so that the guide bars 35 may be moved back and forth sideways to partially cover or uncover the mouth of the slot 30 and then set securely by means of the screws 41.

Figure 3:
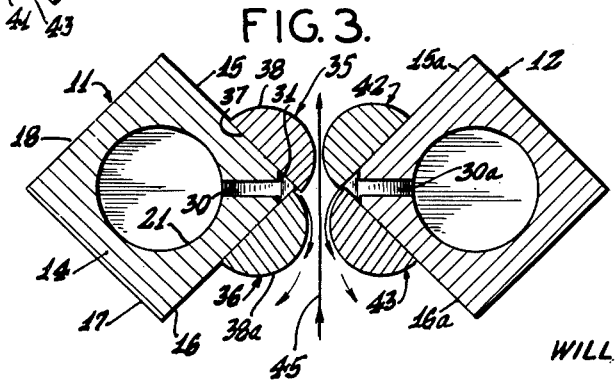
FIG. 3 is a cross-sectional view taken on the line 3—3 of FIG. 2.

Squeegee body 12 is provided with corresponding guide bars 42 and 43 attached to walls 15a and 16a respectively. The proper adjustment of the guide bars is shown in FIG. 3, wherein the direction of the film 45 is indicated by the arrows. The guide bars 35 and 42 on the side to which the film is moving are adjusted to overlap the slots 30, 30a, and the guide bars 36, 43 on the side from which the film is coming and adjusted back of the corner between walls 15 and 16, to expose a small portion of the mouth of associated slot 30 or 30a.

Thus, forced air from the hose 27 of squeegee 11 is carried into the opening 21, then is fed through slot 30 where it strikes the flat inside surface 37 of guide bar 35. The surface 37 of the guide bar is at an angle with respect to the slot 30, and therefore the forced air is directed by the angled surface through the slot between the two bars 35 and 36 in the direction of the curved arrows—contrary to the direction of movement of the film 45. The air is further drawn around the curved surface 38a of guide bar 36 by the principle of the airfoil. The arrows show the path the flow of air follows in passing across the portion of the film between the two squeegees and back away from the film toward the walls 16 and 16a. The air moving away from the film will carry liquid and particles away from the film, causing quick drying, preventing carryover and taking away the particles so that they do not remain on the film.

It will thus be seen that there is provided an apparatus in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

I claim:
1. An air squeegee comprising a hollow elongated body, closed at one end and having an inlet at its other end, said body being formed with an elongated slot extending longitudinally of the body and communicating with the interior of the body, means on the body extending longitudinally of slot and adjacent thereto, and having a transversely curved convex elongated outer surface, and means on the body overlapping said slot at an angle thereto and overlapping said curved surface to direct air passing from the body through the slot onto said curved surface.

2. An air squeegee comprising a body having a pair of outer flat longitudinal surfaces converging to a corner, said body being closed at one end and having means at its other end to receive a current of air, said body being formed with a longitudinal slot at said corner at an angle bisecting the angle between said surfaces, and bars attached to said faces, longitudinally of said slot with one bar overlapping said slot and the other bar, said other bar having a convexly rounded outer surface overlapped by said one bar.

3. The combination of claim 2, a nozzle attached to said other end of said body and having means to clamp the body to a supporting plate.

4. The combination of claim 2, in combination with means to attach said bars to said body in transversely adjusted positions.

5. An air squeegee comprising a body having a portion of square outer shape and having a neck at one end and being formed with an internal chamber and with a longitudinal radial slot at a longitudinal corner of the body, a pair of similar bars having flat inner surfaces contacting a pair of adjacent flat outer surfaces of the body, at opposite sides of said slot, said bars having transversely curved convex outer surfaces, and flat ends formed with transverse slots and means passing through said transverse slot for attaching said bars to said body.

6. The combination of claim 5, in combination with an adaptor having a sleeve screwed within said neck, and a nozzle and a nut portion between the neck and nozzle.

7. The combination of claim 5, the rim of said elongated slot being flat.

8. An air squeegee comprising a hollow body formed with a longitudinal slot and with flat diverging outer faces at opposite sides of said slot, a pair of bars on said faces, said bars having flat inner surfaces contacting said faces, and transversely convex outer curved surfaces and means to attach said bars to said faces of said body in adjusted positions transversely so that a side edge of one bar may overlap the adjacent side edge of the other bar.

9. An air squeegee for motion picture film comprising a support, a pair of parallel hollow opposed bodies attached to said support, said bodies having air inlets and being formed with inner longitudinal, opposed slots in a common plane, means on each body coextensive with its slot and providing an outer transversely curved surface, and means on each body overlapping its slot at an angle thereto, and also overlapping its curved surface whereby to direct air flowing from its slot at angle to the slot and onto said curved surface.

10. An air squeegee for film comprising a hollow body, conduit means to supply air to said body, said body being formed with an elongated narrow passage communicating with the hollow interior thereof, and means on the body at the outside of said body, to direct the flow of air through said narrow passage at an angle away from and to one side of said passage, said air directing means comprising a pair of elongated guide members, one of said guide members having a longitudinal edge portion extending beyond the longitudinal middle of said narrow air passage and overlapping an adjacent edge of the other of said guide members, and said other guide member being spaced short of one side of the longitudinal middle of said passage and away from the overlapping portion of said first guide member, and said other of said guide members having a convexly rounded outer surface extending from said adjacent edge thereof.

References Cited in the file of this patent

UNITED STATES PATENTS

| | | |
|---|---|---|
| 1,759,804 | Pieron | May 29, 1930 |
| 1,930,575 | Wynd et al. | Oct. 17, 1933 |
| 2,057,903 | Moreland et al. | Oct. 30, 1936 |
| 2,097,601 | Potdevin | Nov. 2, 1937 |
| 2,289,753 | Capstaff | July 14, 1942 |
| 2,386,156 | Woodward | Oct. 2, 1945 |

FOREIGN PATENTS

| | | |
|---|---|---|
| 631,625 | Germany | July 11, 1936 |
| 787,281 | Great Britain | Dec. 4, 1957 |